(12) United States Patent
Tsunoda et al.

(10) Patent No.: US 7,627,754 B2
(45) Date of Patent: Dec. 1, 2009

(54) DOCUMENT DATA IDENTITY VERIFYING APPARATUS

(75) Inventors: Takeshi Tsunoda, Yokohama (JP); Kunihito Takeuchi, Zushi (JP)

(73) Assignee: Hitachi, Ltd., Tokyo (JP)

( * ) Notice: Subject to any disclaimer, the term of this patent is extended or adjusted under 35 U.S.C. 154(b) by 869 days.

(21) Appl. No.: 11/176,478

(22) Filed: Jul. 6, 2005

(65) Prior Publication Data

US 2006/0123228 A1 Jun. 8, 2006

(30) Foreign Application Priority Data

Dec. 3, 2004 (JP) ............................ 2004-351495

(51) Int. Cl.
*H04L 9/00* (2006.01)
(52) U.S. Cl. .......................... 713/161; 713/176; 726/2
(58) Field of Classification Search ................. 713/161, 713/176; 709/217; 726/2; 707/1, 100, 200; 715/200
See application file for complete search history.

(56) References Cited

U.S. PATENT DOCUMENTS

| | | | |
|---|---|---|---|
| 5,911,776 A * | 6/1999 | Guck ........................ | 709/217 |
| 2004/0123111 A1* | 6/2004 | Makita et al. ............... | 713/176 |
| 2004/0139207 A1 | 7/2004 | De Jong | |

FOREIGN PATENT DOCUMENTS

| | | |
|---|---|---|
| JP | 08-329050 | 12/1996 |
| JP | 2003-022009 | 1/2003 |

* cited by examiner

*Primary Examiner*—Kimyen Vu
*Assistant Examiner*—Baotran N To
(74) *Attorney, Agent, or Firm*—Townsend and Townsend and Crew LLP

(57) ABSTRACT

An object of the present invention is to provide a document data identity verifying technology which is capable of easily manage identity of data in a file generated from the original data. An apparatus includes: an I/O unit 15 which receives document data in a first format from a creation source of the document data and receives the document data in the first format from the reception source of the document data or the document data converted into another format; a format management unit 100 which converts the received document data in the first format into another format according to a preset conversion definition; an irreversible cipher management unit 105 which generates an irreversible cipher on the received document data; and an irreversible cipher verification unit 110 which verifies the irreversible cipher generated based on the document data in the first format received from the creation source or the document data converted into another format by the format management unit 100 and an irreversible cipher generated based on the document data received from the reception source; wherein identity of the document data received from the creation source and the document data received from the reception source is validated according to the verification results.

8 Claims, 7 Drawing Sheets

FIG. 3

45 FILE RECORDER

| ID | REGISTRANT | FILE EXTENSION | IRREVERSIBLE CIPHER | FILE |
|---|---|---|---|---|
| | YAMADA | htm | abc······ | ··t^ɔ^起㏂min0ƎSD} |
| | SYSTEM | doc | efg······ | jg0B0······t^ |
| | SYSTEM | pdf | hij······ | ·sk0B0_0c0f0n0Ŧ0 |
| | MURAKAMI | pdf | klm······ | ·0ｻ_o⁷ gNOPщ甲^ |
| | SYSTEM | doc | nop······ | 0 Omi。雇⅜0·ｿ0 |
| | SYETEM | html | qrs······ | wck'˝ ɔx⁄On0_0· |
| | | | | |

FIG. 4

50 IDENTIFY DATA RECORDER

| IRREVERSIBLE CIPHER OF ORIGINAL FILE | IRREVERSIBLE CIPHER 1 | IRREVERSIBLE CIPHER 2 | ... |
|---|---|---|---|
| abc······ | efg······ | hij······ | ... |
| klm······ | nop······ | qrs······ | ... |
| tuv······ | wxy······ | z12······ | ... |
| | | | |

FIG. 5

55 CONVERSION DEFINITION RECORDER

| CONVERSION SOURCE | CONVERSION FORMAT 1 | CONVERSION FORMAT 2 | ... |
|---|---|---|---|
| htm | doc | pdf | ... |
| doc | htm | pdf | ... |
| ppt | htm | btm | ... |
| ... | ... | ... | |

DOCUMENT DATA IDENTITY VERIFYING APPARATUS

CLAIMS OF PRIORITY

The present application claims prority from Japanese application serial no. JP2004-351495, filed on Dec. 3, 2004, the content of which is hereby incorporated by reference into this application.

BACKGROUND OF THE INVENTION

The present invention relates to a technology for verifying identity of document data, and more specifically to a technology for verifying identity of document data that can manage identity of data stored in a file created from the original data. It should be noted that the term "identity" referred to in this specification shall simply have capability of detecting falsification of document data, and it shall not have to secure exactly the same data.

Conventionally, to distribute data upon confirming authenticity of data created by the data creation source and the identity of the data creation source as well, it was necessary to apply an electronic signature, etc. to the file created in the file format that was specified at the time of creating the data.

Suppose a case, for example, where business connections exist among companies A, B and C and data passing is conducted in this order, in which only document data of a first format (Excel (registered mark) data) is provided by the company A, and document data of a second and a third formats (XML (registered mark) data and PDF (registered mark) data) are required by the company B and the company C, respectively.

In such a case, normally, the company A puts an electronic signature on the Excel file created within the company and provides the file to the company B. The company B, after verifying the signature of the company A, converts the file to XML data, puts an electronic signature of the company on the Excel file provided by the company A, and then provides the file to the company C. Likewise, the company C, after verifying the signature of the company B, verifies the signature of the company A's data, and converts the data into the PDF format to manage the files. It should be noted that, for the example case, verification will not be possible after the expiry date of the certification. Prior arts that state the above-stated procedures include Japanese Patent Laid-open Nos. 8-329050 and 2003-22009 and U.S. Patent Application Publication No. 2004/139207.

SUMMARY OF THE INVENTION

The prior arts require bothersome processes such as identification of a user himself or herself, management of a key thereof, and further validity confirmation to a certificate authority, etc. to assure security. In addition, the prior arts require personal or system burdens such as caring for expiration of the certificate.

In addition, in many cases, the file format of data sent and received is inadequate for capturing and processing in the system. When this is the case, a user who received the data is required to convert data at the user's risk. Therefore, when relaying of data of the creation source is conducted, the processing will be complicated.

The present invention has been made in view of the above-stated problems, and an object of the present invention is to provide a technology for verifying identity of document data that can easily manage identity of data in a file created from the original data.

The present invention manages versatile file formats that are created from common data by using irreversible symbols such as hash values and verifies authenticity of data through comparison using a random file format. In addition, the present invention includes provision of data in a file format required. It should be noted that, more specifically, the following apparatus is adopted.

The present invention is configured to include: an I/O unit which receives document data in a first format from a creation source of the document data and receives the document data in the first format or the document data which is converted in another format from a reception source of the document data; a format management unit which converts the document data in the first format received into another format according to a preset conversion definition; an irreversible cipher management unit which generates an irreversible cipher on the document data received; and an irreversible cipher verification unit which verifies an irreversible cipher that is generated based on the document data in the first format received from the creation source or the document data converted into another format by the format management unit and an irreversible cipher that is generated based on document data received from a reception source; wherein identity of the document data received from the creation source and the document data received from the reception source is validated.

Since it has the configuration stated above, the present invention can provide a technology for verifying identity of document data which can easily manage identity of data in a file that is created from the original data.

BRIEF DESCRIPTION OF THE DRAWINGS

FIG. 3 is a diagram illustrating a specific example of a file recorder 45;

FIG. 4 is a diagram illustrating a specific example of an identity data recorder 50;

FIG. 5 is a diagram specifically illustrating a conversion definition recorder 55;

DESCRIPTION OF THE PREFERRED EMBODIMENTS

Figure 1:
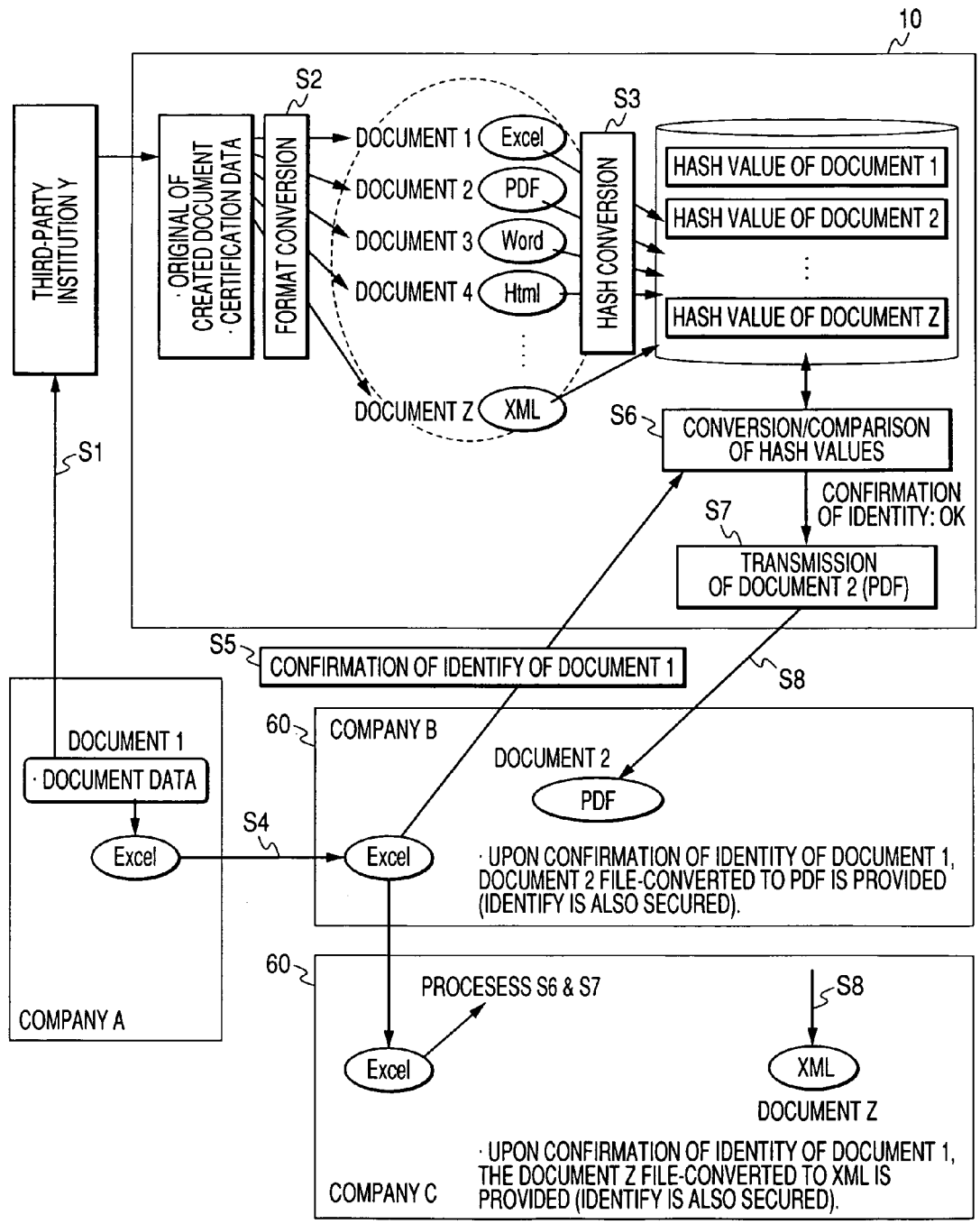
FIG. 1 is a schematic diagram illustrating a document data identity verifying apparatus according to a preferred embodiment of the present invention.

Hereinafter, a specific embodiment of the invention will be described with reference to the accompanying drawings. FIG. 1 is a schematic diagram illustrating a document data identity verifying apparatus according to the preferred embodiment of the present invention.

First, the company A, which is the creation source of data, operates a terminal device 60 and registers document data in a format 1 (excel) that is created by the company itself with a third-party institution Y (Step S1). The document data registered is format-converted in the identity verification device 10 to create a document 2, a document 3, up to a document Z, which are document data in a format 2, a format 3, up to a format Z, respectively (Step S2). Then, an irreversible cipher (a hash value) is created for each of the document 2, the document 3, up to the document Z created (Step S3).

The company A, which is the creation source of the above-stated data, transmits the document data created in format 1 (excel) to the company B (Step S4). The company B transmits the document data (excel) received to the data identity verification device 10 (Step S5). The identity verification device 10 creates a hash value based on the document data received (excel) and compares the hash value thus created and the hash value of the document 1 (excel) created in the Step S3 (Step S6). Matching of the two hash values implies that identity of the document data that the company B received from the company A in Step 4 and the document data that the company A registered with the third-party institution Y in Step 1 has been confirmed. Following the confirmation of identity, the identity verification device 10 transmits, for example, the document Z, which is a document converted into the format Z (XML), to the company B (Step S7). The company B receives the document Z. The document Z received is created by the identity verification device 10 based on the document data in format 1 (excel) that is created by the company A; therefore, the identity of the document Z with the document data in format 1 (excel) created by the company A is guaranteed by the identity verification device 10.

The company C receives the document data in format 1 (excel) from the company B. The company C which received the document data can obtain document data (PDF, for example) whose identity with the document data in format 1 (excel) created by the company A is guaranteed by the identity verification device 10 by executing processing of Steps 6, 7 and 8 as is the case with the company B.

Figure 2:
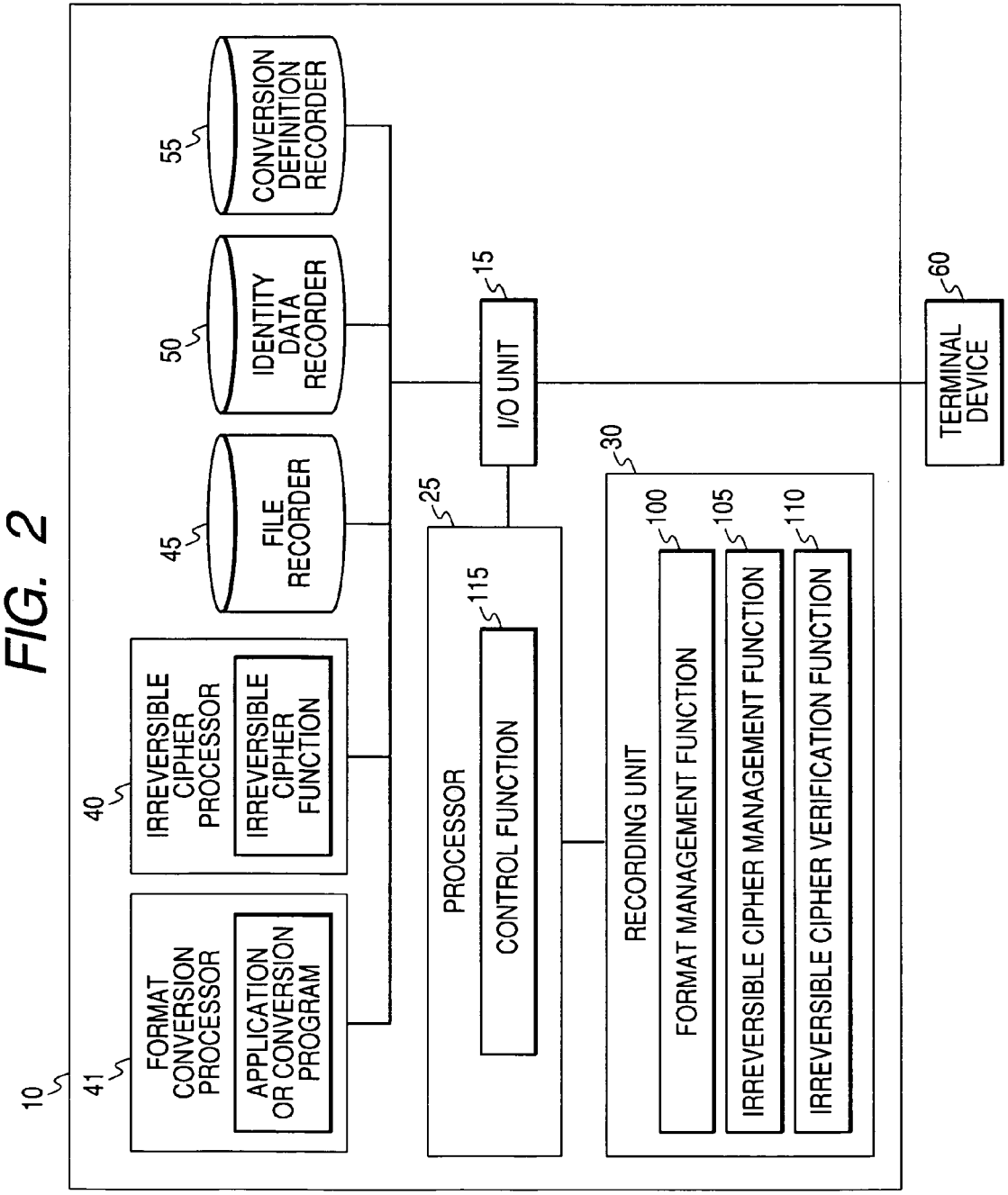
FIG. 2 is a detailed diagram illustrating a data identity verification device 10.

FIG. 2 is a detailed diagram illustrating a data identity verification device 10. Referring to FIG. 2, the data identity verification device 10 includes an I/O unit 15, a processor 25 and a recorder 30. The recorder 30 includes a format management function 100, an irreversible cipher management function 105 and an irreversible cipher verification function 110. It should be noted that each of these functions is configured as a processor that is achieved by a program.

Further, in the data identity verification device 10, recorders 45, 50 and 55, an irreversible cipher processor 40 and a format conversion processor 41 are connected to one another. The data identity verification device 10 refers to and updates these recorders 45, 50 and 55 as required and further requests the irreversible cipher processor 40 and the format conversion processor 41 for processing.

Hereinafter, each component of the data identity verification device 10 will be described. The I/O unit 15 inputs and outputs data with a terminal device 60, the recorders 45, 50 and 55, the format conversion processor 41 and the irreversible cipher processor 40, which are connected to the I/O unit 15 via a network. The file recorder 45 stores the original file, a converted file in which the original is converted and file data that are transmitted from the above-stated company A, for example.

FIG. 3 is a diagram illustrating a specific example of the file recorder 45. File information is stored with a registrant ID, a registrant, a file extension and an irreversible cipher associated with the file itself. It should be noted that a recorder that stores and manages the information with related IDs associated with the information is separately required, but the recorder will not be shown in the figure.

The registrant referred to here is a person who actually registered a file, and registration is carried out in two cases: a case where a file that is registered by the registrant (hereinafter referred to as an "original file") is registered; and a case where a file that is processed to convert an original file into a file format that can be used by another application. The registrant for the latter case is a system. A file extension is used to identify an application that is associated with the registered file, and is shown by the last three English letters (in the case of htm, the extension may sometimes be html) of the file name. For example, if it is "htm", the extension shows a file format that can be displayed by a Web browser. If it is "doc", the extension shows the file supports the Word application. The irreversible cipher will be described later.

FIG. 4 is a diagram illustrating a specific example of the identity data recorder 50. The identity data recorder 50 is a recorder that stores a value converted by using a hash algorithm (which is called a hash value) after the hash value is associated with the original file. In the identity data recorder 50, data obtained by converting the original file into a hash value and data obtained by converting a file that is converted into different format from the original file into a hash value are stored in an associated manner. Specifically, for example, data obtained by converting a certain original file into a hash value is stored in a field called an original file irreversible cipher, and data obtained by converting the original file into hash values of files that are converted into a plurality of different file formats are stored as an irreversible cipher 1, an irreversible cipher 2, and so on.

FIG. 5 shows a diagram specifically describing the conversion definition recorder 55. The conversion definition recorder 55 is a recorder that stores a file format by associating the format with a conversion file format that is adequate for the file format of the original file. In the conversion definition recorder 55, a file format of the original file and a file format that is convertible from the file format are associated with each other for storage. Referring to FIG. 5, the "htm" which exists in the field "conversion source", for example, implies that the original file is a file format that can be displayed on a Web browser. In addition, as a file format that is convertible from the file format is associated with the "doc" (corresponding to the "Word" application, in this case) that exists in the field of a conversion format 1, and with the "pdf" (corresponding to an application that supports a pdf file) that exists in the field of a conversion format 2. A symbol in each field indicates a file extension, and the symbol can be used in an application that supports the extension. In addition, it may also be arranged that association of the conversion source with the conversion format can be randomly set.

In the irreversible cipher processor 40, an irreversible cipher function stays resident to convert a file inputted into an irreversible cipher. The irreversible cipher function is used to convert data having any length into a length in fixed value of irreversible nature by applying a one-way arithmetic function thereto. Such a function is called a hash algorithm. Incidentally, while a hash algorithm is adopted in this embodiment, however, the embodiment is not limited to such an algorithm. It may be another algorithm that generates a value that is difficult for the original file to generate or presume.

In the format conversion processor 41, a plurality of conversion programs stay resident, and the format conversion processor 41 outputs a file in which an inputted file format is converted to a designated file format. The conversion programs referred to here mean applications such as spread sheet software or a word processor, or otherwise, programs that only execute conversion off a certain format into another format. The format conversion processor 41 requires a separate recorder that manages an appropriate conversion program based on an extension that indicates a format of the original file and an extension that indicates a conversion format. However, with the embodiment, such a recorder is not shown in FIG. 5.

As stated in the above, a description has been made of recorders that are connected to the data identity verification device 10. Note that, however, these recorders are described as independent devices here for the purpose of clarifying the description, which shall not be understood that independent recorders are always required in actual embodiments.

In the processor 25, a control function 115 stays resident, and the control function 115 controls input and output of data to and from a terminal device 60 and startup and exit of the following functions as well: a format management function 100; an irreversible cipher management function 105; and an irreversible cipher verification function 110. In addition, a recording unit 30 stores the format management function 100, the irreversible cipher management function 105 and the irreversible cipher verification function 110.

The irreversible cipher management function 105 is a program that acquires an irreversible cipher by entering a file to the irreversible cipher processor 40. When verification of an irreversible cipher that is acquired by the irreversible cipher management function 105 and an irreversible cipher that is stored in the identity data recorder 50, the irreversible cipher management function 105 temporarily stores the irreversible cipher thus acquired. When the verification is not executed, the irreversible cipher management function 105 records the file and the acquired irreversible cipher on the file recorder 45 and the identity data recorder 50, respectively.

The irreversible cipher verification function 110 compares a value encrypted by the irreversible cipher management function 105 and an irreversible cipher that is stored in the identity data recorder 50 and returns a result of judgment as to whether the two irreversible ciphers match with each other. When the two irreversible ciphers match with each other, if a file that is formatted as required by an operator of the terminal device 60 further exists, the irreversible cipher verification function 110 extracts the original file that is associated with the irreversible cipher of the original file stored in the identity data recorder 50 and temporarily stores the original file extracted.

The terminal device 60 is a terminal unit that is used by a user. The user executes transmission and reception of data and a file with the data identity verification device 10 via the terminal device 60. The terminal device 60 includes a transmission/reception unit and an I/O unit that are not shown in the figure. It is to be noted that, in FIG. 2, only one unit of terminal device is shown for convenience, which does not mean that the number of terminal units is limited. In addition, with the embodiment, transmission and reception of data and a file are conducted on a WWW server and a browser, presuming the case where such transmission and reception of data and a file between the data identity verification device 10 and the terminal device 60 which is a customer terminal unit. However, the present invention is not limited to such a method.

Figure 6:
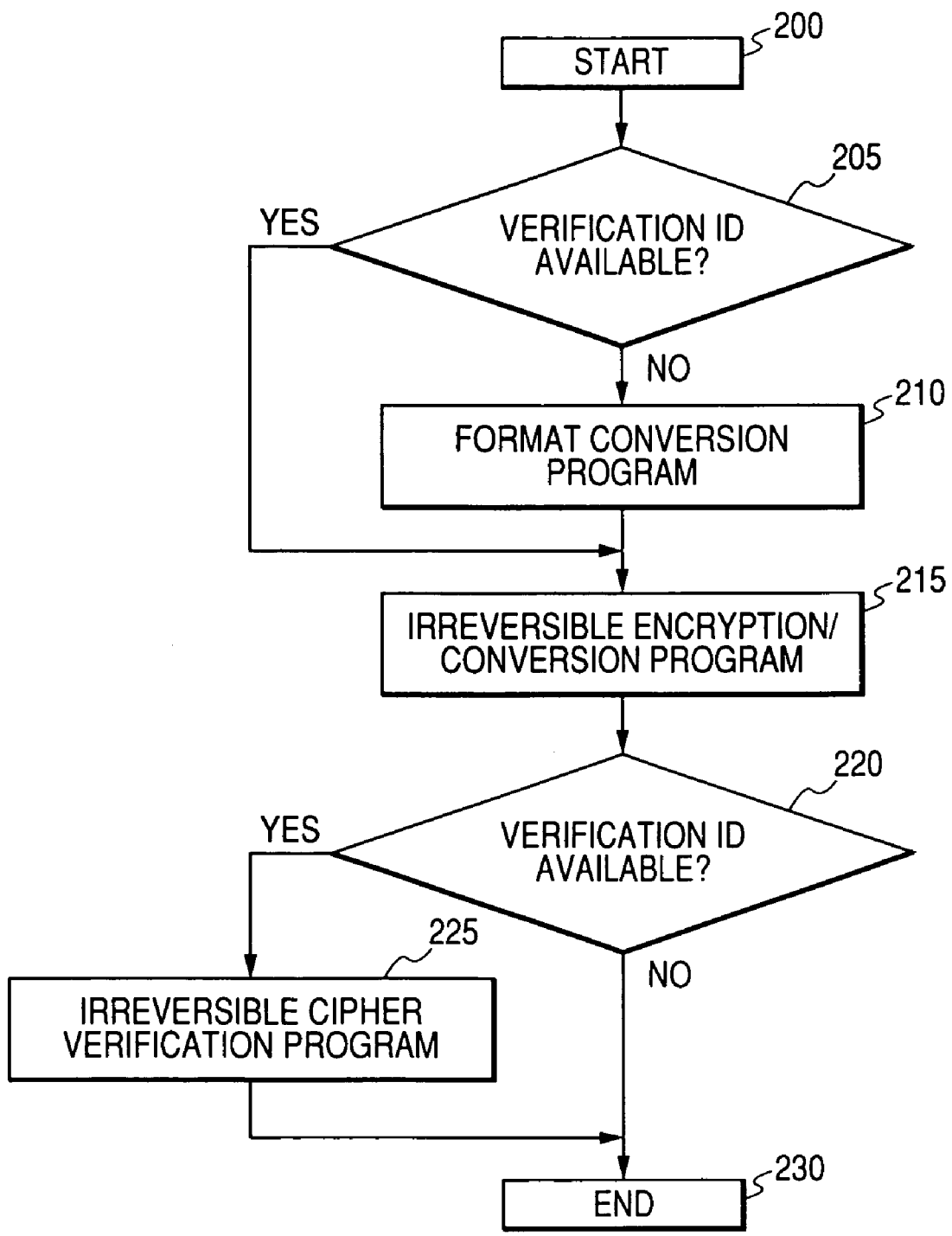
FIG. 6 is a flow chart illustrating processing of the data identity verification device 10.

FIG. 6 shows a flow chart describing processing of the data identity verification device 10. First, in Step 205, when access is made from the terminal device 60, a judgment is made based on the customer management ID of a user as to whether such access is a verification request from a user (e.g. the company B or the company C). If the access is a verification request, the process is advanced to Step 215. If the access is not a verification request (for example, a case where it is a file registration request from the company A), the file for which registration is requested is converted into a file of a given format and registered in Step 210. In Step 215, an irreversible cipher is generated for each of the file for which registration is requested and the format-converted file and the ciphers are registered. In Step 225, when an access is made from the terminal unit 60, a judgment is made based on the customer management ID of a user as to whether such access is a verification request from a user (e.g. the company B or the company C). If the access is a verification request, an irreversible cipher is generated for the file for which registration is requested. Then, the irreversible cipher thus generated is compared with the irreversible cipher that is generated based on the file for which registration is requested (from the company A) (or the file concerned which is converted into a file having the same format as the file for which verification is requested).

Figure 7:
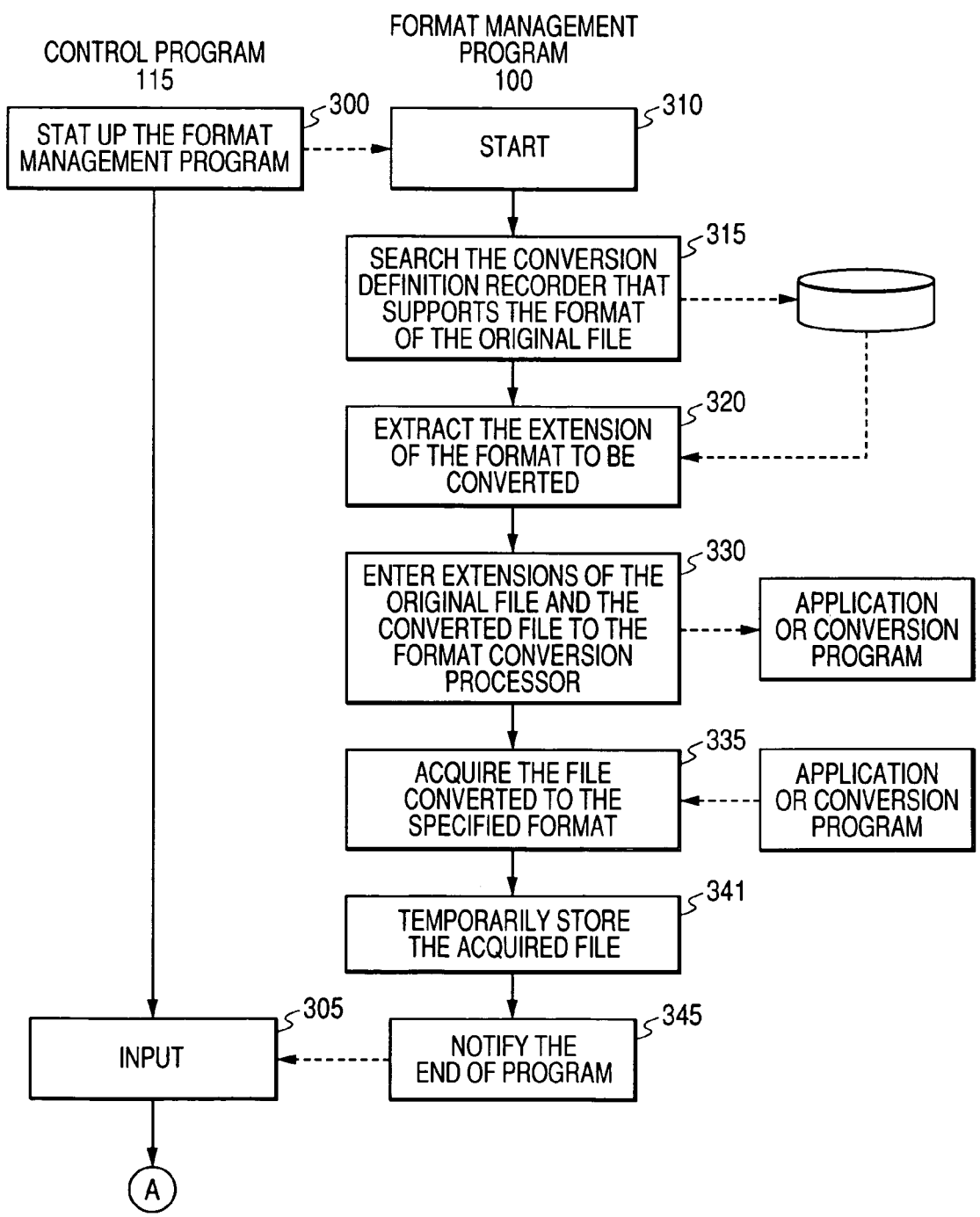
FIG. 7 is a flow chart illustrating processing of a format management function 100.

FIG. 7 shows a flow chart describing processing of the format management function 100. An operator who is not shown in FIG. 7 logs in the data identity verification device 10 from the terminal device 60, enters the customer management ID of a customer, and transmits a file. When the ID is not an ID to indicate verification with an irreversible cipher stored in the identity data recorder 50, the control function 115 starts up the format management function 100 (Step 300). When the ID is an ID to indicate the verification, the irreversible cipher management function 105 is started up (Step 405).

Here, a recorder that manages and stores IDs by associating an ID for verification purpose and an ID for non-verification purpose with a customer who logs in the terminal device 60 is required separately. However, such a recorder will not be shown in FIG. 7. In addition, the operator may be the customer, or alternatively, a third-party institution such as a public or private service trader that can be trusted for storing a file or data of such customer. Further, the third-party institution may sometimes put data from a customer into a file for use of the service in the embodiment.

Furthermore, there may be a case where the operator is a customer at the transmission and reception destination of a file who directly transmits and receives a file that is converted into a format associated with the original file to and from a customer who created the original file and the data. Transmission of a file by the customer at the transmission and reception destination of a file from the terminal device 60 means the customer has a verification ID. In addition, when the validation result of a file transmitted by the customer at the transmission and reception destination of a file is true, it is possible to request the customer to return the file in a format that is different from the file transmitted. In this case, the data in which the file format to be requested is expressed in the file extension is entered together with the file to be transmitted. For example, the file extension "doc" means the Word format, while "txt" means the text format.

Next, the format management function 100 searches the conversion definition recorder 55 for a format to be converted, based on the extension of the original file transmitted from the terminal device 60 (Step 315), and then extracts the extension of the format to be converted (Step 320). Next, the extensions of the original file and the conversion format extracted are entered to the format conversion processor 41 in which a program that can convert a format into an intended format stays resident (Step 330). Further, when a plurality of formats to be converted exist, the above-stated procedures will be repeated.

Next, the converted file is acquired from the format conversion processor 41 (Step 335), the file is stored in a volatile memory (hereinafter simply referred to as a "memory") (Step 341), and the end-of-program notification is output to the control function 115 (Step 345). The control function 115, upon receiving the end-of-program notification (Step 305), then starts up the irreversible cipher management function 105 (Step 400 on the following drawing).

Figure 8:
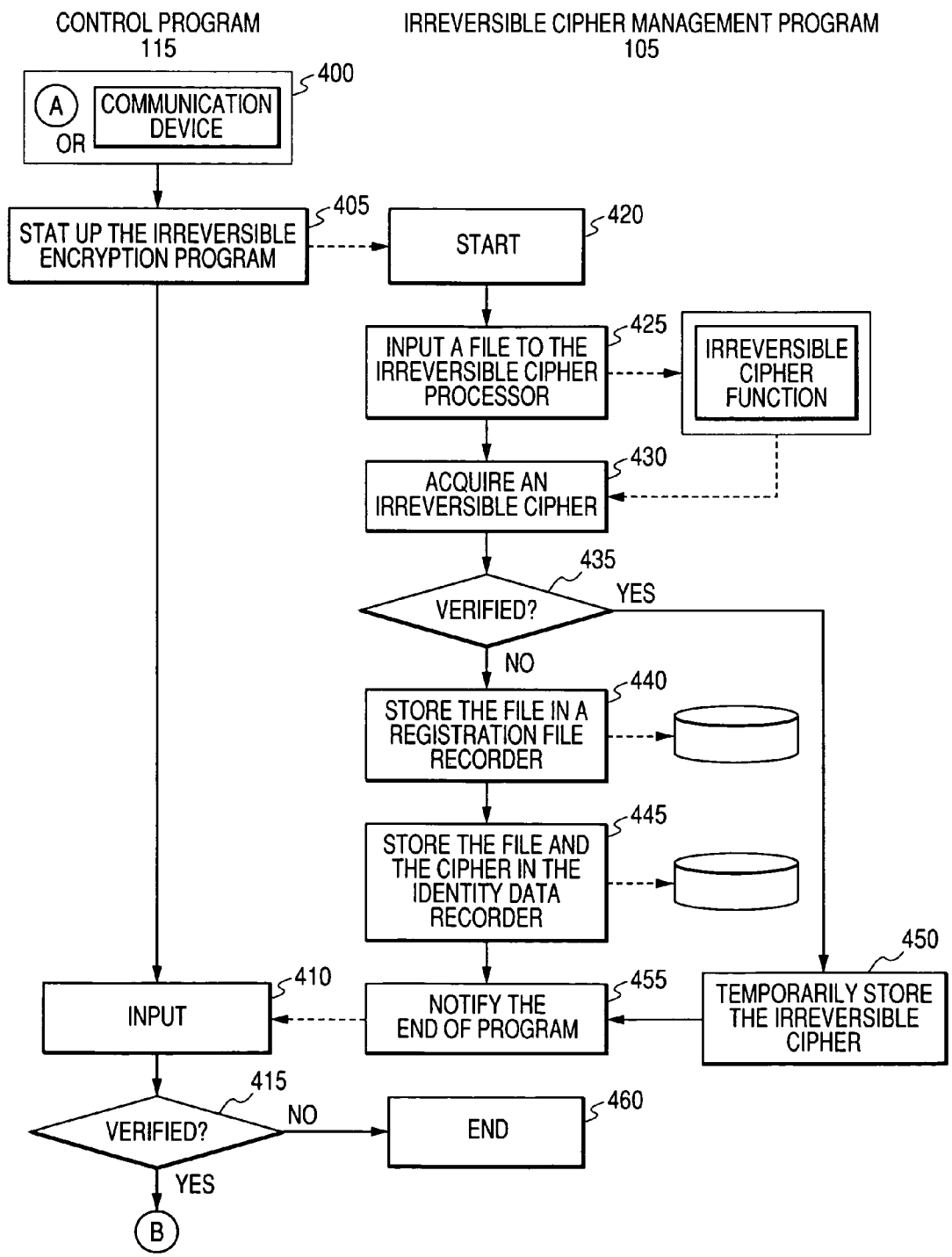
FIG. 8 is a flow chart illustrating processing of an irreversible cipher management function 105.

FIG. 8 shows a flow chart describing processing of the irreversible cipher management function 105. The irreversible cipher management function 105 has an input value from the format management function 100, or alternatively, it sometimes has a file and data inputted from the terminal device 60. The irreversible cipher management function 105 inputs a formatted file acquired by the format management function 100 or a file inputted from the terminal device 60 to the irreversible cipher processor 40 (Step 425). The irreversible cipher processor 40 generates an irreversible cipher that corresponds to the file inputted and stores the cipher (Step 430).

Thereafter, when an ID showing a verification request is inputted to the irreversible cipher management function 105 (for example, a verification request is made by the company B or the company C), the irreversible cipher of the file for which verification is required is stored in a memory to compare the irreversible cipher with the irreversible cipher stored in the identity data recorder 50 (Step 450). The process is then advanced to the next step.

When the irreversible cipher management function 105 does not have an ID requesting for verification, the registrant of the file, the extension of the file, the irreversible cipher and the file are registered in a registration file recorder (Step 440), and the original file and the irreversible cipher of the converted file are registered in the identity data recorder 50 (Step 445).

It should be noted that, regarding the original file, the file registrant will be an ID for management of a customer who logs in the terminal device 60, and, regarding the format-converted file, the file registrant will be an ID showing the system (Refer to FIG. 3). Here, a recorder to manage and store IDs by associating the IDs with a logging in customer or a system is required separately. However, with the embodiment, such a recorder will not be shown in the drawing.

The control function 115 which has received an end-of-program notification, when having an ID to request verification, starts up the irreversible cipher verification device 110 (Step 500), and, when not having an ID to request verification, terminate the process (Step 460).

Figure 9:
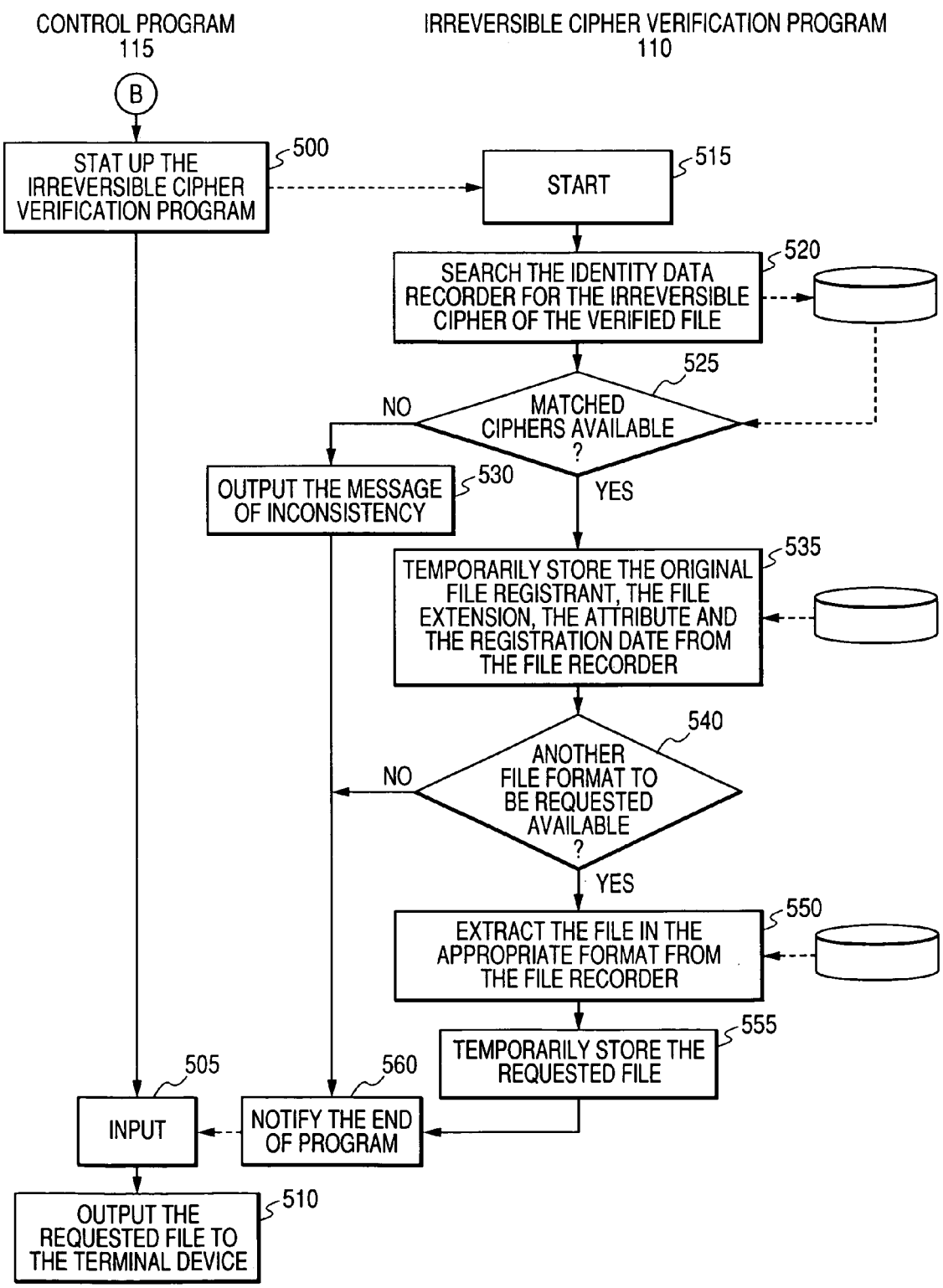
FIG. 9 is a flow chart illustrating processing of an irreversible cipher verification device 110.

FIG. 9 shows a flow chart describing processing of the irreversible cipher verification device 110. The irreversible cipher verification device 110 compares an irreversible cipher stored in a memory and an irreversible cipher stored in the identity data recorder 50 by using the irreversible cipher management function 105 (Step 520) and judges whether the two ciphers match or not (Step 525). If they do not match with each other, a message of mismatch is output (Step 530). If they match with each other, the process is advanced to the next step.

Next, the irreversible cipher verification device 110 extracts an irreversible cipher of the original file having the matched irreversible cipher from the identity data recorder 50, and stores the registrant, the extension and the registration date of the original file having the irreversible cipher in a memory from the file recorder 45 (Step 535).

Next, the irreversible cipher verification device 110 judges whether or not another file format to be requested exists (Step 540). When another file format to be requested does not exist, the irreversible cipher verification device 110 outputs an end-of-program notification to the control function 115 (Step 560). When another file format to be requested exists, the process is advanced to the next step.

The irreversible cipher verification device 110 extracts the extension of the file that is inputted as another file format to be requested and the converted file having the same extension that is associated with the original file stored in the file recorder 45 (Step 550), and stores the extension and the converted file in a memory (Step 555). Here, a recorder that manages and stores IDs of the original file and the converted files that are associated with the original file is required separately. However, with the embodiment, such a recorder will not be shown in the drawing.

The irreversible cipher verification device 110 outputs an end-of-program notification to the control function 115 (Step 560). The irreversible cipher verification device 110, upon receiving the end-of-program notification, if validation result stored in the memory as well as the file format requested and having true validation result exist in the terminal device 60, transmits the requested file and terminates the process (Step 510).

As stated above, according to the embodiment, it is possible to realize identity certification which is mandatory for storage service of document data to be exchanged among business traders and business documents such as a certificate of tax payment by using a simple system, since confirmation of identity can be easily executed while allowing a broad range of file formats.

What is claimed is:

1. A document data identity verifying apparatus which verifies identity of document data, said apparatus comprising:
   an I/O unit which receives document data in a first format from a creation source of the document data and receives the document data in the first format or said document data which is converted in another format from a reception source of said document data;
   a format management unit which converts the document data in the first format received into another format according to a preset conversion definition;
   an irreversible cipher management unit which generates an irreversible cipher on the document data received;
   a file recorder which records a registrant ID, a document format, and the irreversible cipher associated with the document data;
   an irreversible cipher verification unit which verifies an irreversible cipher that is generated based on the document data in the first format received from said creation source or the document data converted into another format by said format management unit and an irreversible cipher that is generated based on document data received from a reception source; and
   an identity data recorder in which the irreversible cipher generated on the document data in the first format or the irreversible cipher generated on the document data that is converted into said another format by said format management unit and the irreversible cipher generated based on the document data from the reception source are associated with each other for storage,
   wherein a request from the reception source is judged whether the request is a file request or a verification request according to an identifier of the reception source,
   wherein identity of the document data received from said creation source and the document data received from said reception source is validated, and
   wherein said irreversible cipher verification unit, when results of said verification match with each other, searches said identity data recorder for document data converted into a format different from that of the document data received from the reception source, and transmits the document data searched out according to the request from the reception source.

2. The document data identity verifying apparatus according to claim 1, wherein, when results of said verification match with each other, said irreversible cipher verification unit transmits document data which is converted into a format different from that of the document data received from the reception source according to a request from the reception source.

3. The document data identity verifying apparatus according to claim 1, said apparatus further comprising:
a conversion definition recorder in which a format that is convertible for each format of a document received from a document creation source is selected and recorded in advance.

4. The document data identity verifying apparatus according to claim 1, said apparatus comprising:
a file recorder which stores the document data in the first format received from said creation source of the document data.

5. A document data identity verification method which verifies identity of document data, said method comprising the steps of:
receiving document data in a first format from a creation source of the document data;
converting the received document data in the first format into another format according to a preset conversion definition;
generating an irreversible cipher for each of the document data in the first format and the document data converted into another format;
recording a registrant ID, a document format, and the irreversible cipher associated with the document data;
receiving the document data in the first format or said document data that is converted to another format from a reception source of the document data;
generating an irreversible cipher based on the document data received from said reception source;
verifying an irreversible cipher generated based on the document data received from said creation source of the document data and an irreversible cipher generated based on the document data received from said reception source;
recording the irreversible cipher generated on the document data in the first format from the creation source and the irreversible cipher generated on said document data converted into said another format;
associating in a storage the irreversible cipher generated on the document data in the first format from the creation source and the irreversible cipher generated on said document data converted into said another format;
judging a request from the reception source as to whether the request is a file request or a verification request according to an ID of the reception source;
when results of said verification match with each other, searching said identity data recorder for document data converted into a format different from that of the document data received from the reception source; and
transmitting the document data searched out according to the request from the reception source,
wherein identity of the document data received from said creation source and the document data received from said reception source is verified according to verification results.

6. Then document data identity verification method according to claim 5, wherein, when the verification results match with each other, the document data converted into a format different from that of the document data received from said reception source is transmitted according to a request from said reception source.

7. The document data identity verification method according to claim 5, wherein, a format which is convertible for each of documents transmitted from the document creation source is recorded in a recorder, and the step executing said conversion executes conversion according to recorded data in said recorder.

8. A memory medium which stores a document data identity verifying program that operates a computer as means for:
receiving document data in a first format from a creation source of the document data;
converting the received document data in the first format into another format according to a preset conversion definition;
generating an irreversible cipher for each of the document data in the first format and the document data converted into another format;
receiving the document data in the first format or said document data that is converted to another format from said reception source of the document data;
generating an irreversible cipher based on the document data received from said reception source; and
verifying an irreversible cipher generated based on the document data received from said creation source of the document data and an irreversible cipher generated based on the document data received from said reception source;
recording the irreversible cipher generated on the document data in the first format from the creation source and the irreversible cipher generated on said document data converted into said another format;
associating in a storage the irreversible cipher generated on the document data in the first format from the creation source and the irreversible cipher generated on said document data converted into said another format;
judging a request from the reception source as to whether the request is a file request or a verification request in accordance with an ID of the reception source;
when results of said verification match with each other, searching said identity data recorder for document data converted into a format different from that of the document data received from the reception source; and
transmitting the document data searched out according to the request from the reception source,
wherein identity of the document data received from said creation source and the document data received from said reception source is verified according to verification results.

* * * * *